A. THOMSON.
SHACKLE.
APPLICATION FILED FEB. 21, 1910.
976,316.
Patented Nov. 22, 1910.
2 SHEETS—SHEET 1.
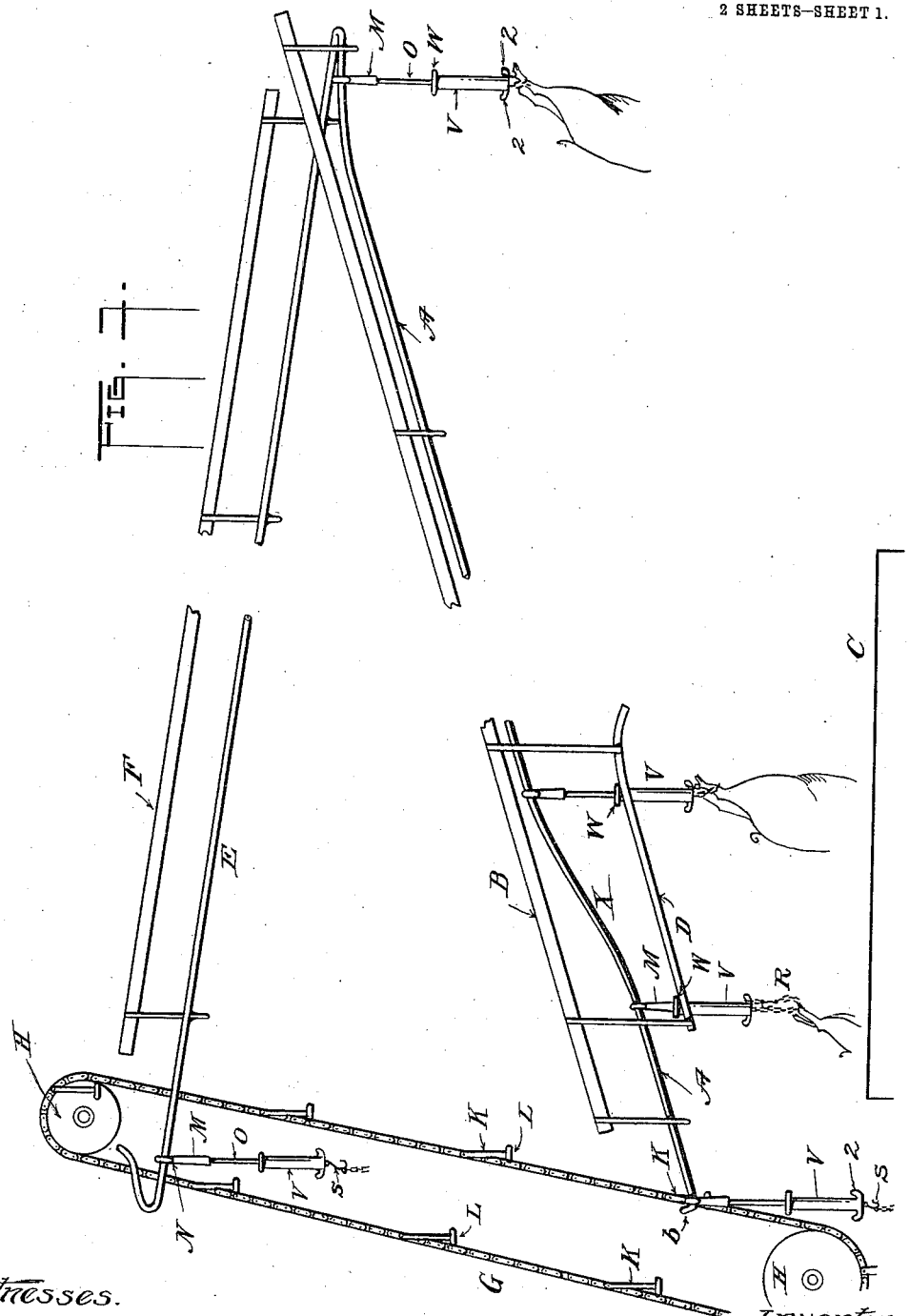
Witnesses.
M. E. Firman
A. Burkhardt
Inventor,
Archibald Thomson,
By L. M. Thurlow,
Atty.

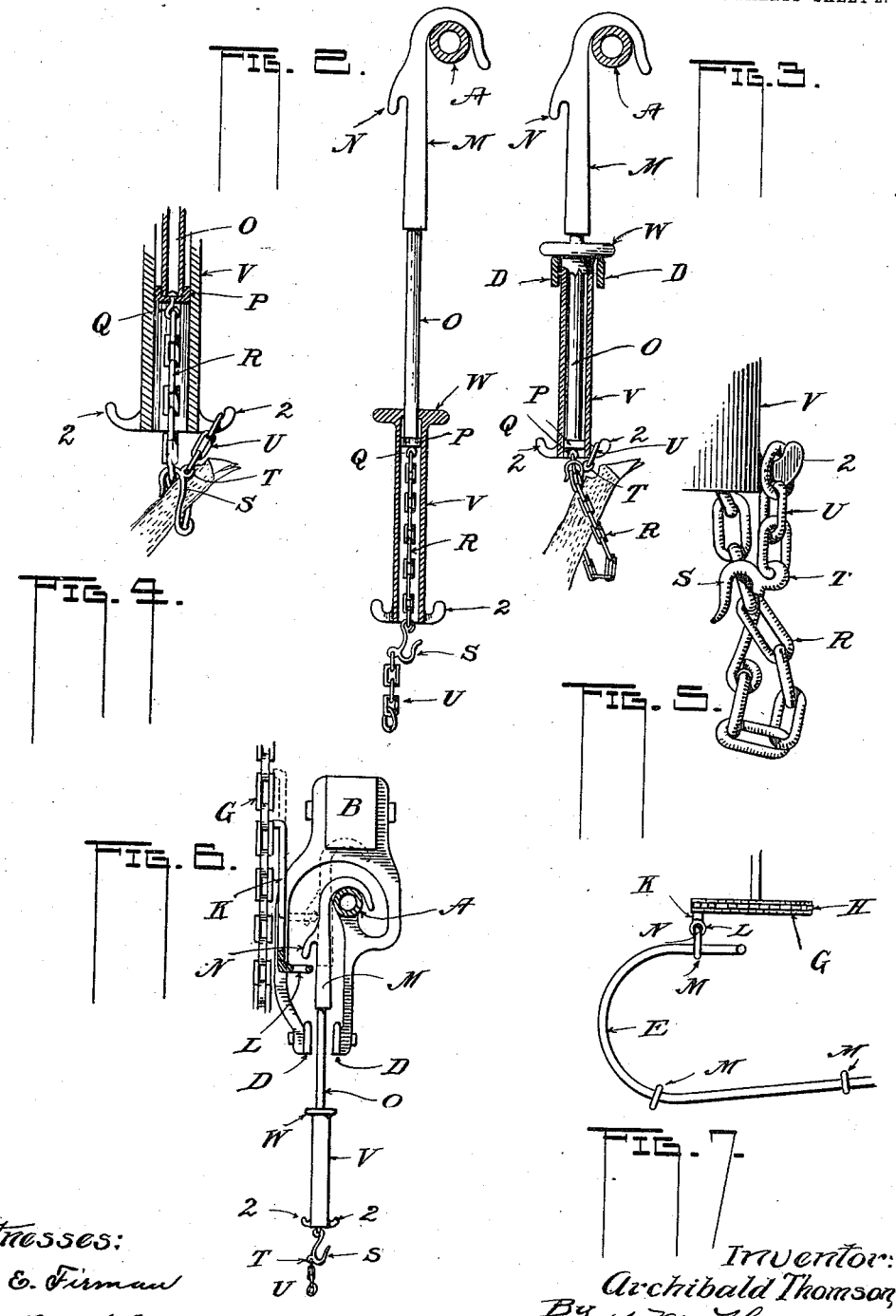

UNITED STATES PATENT OFFICE.

ARCHIBALD THOMSON, OF PEORIA, ILLINOIS.

SHACKLE.

976,316.  Specification of Letters Patent.  Patented Nov. 22, 1910.

Application filed February 21, 1910. Serial No. 545,072.

*To all whom it may concern:*

Be it known that I, ARCHIBALD THOMSON, a citizen of the United States, residing at Peoria, in the county of Peoria and State of Illinois, have invented certain new and useful Improvements in Shackles; and I do hereby declare that the following is a full, clear, and exact description of the invention, which will enable others skilled in the art to which it appertains to make and use the same.

This invention pertains to an automatically operated traveling hog-shackle and apparatus for automatically transferring it from the end of its travel to its starting position.

The primary object of the invention is to construct a shackle which will be caused to automatically release the animal carried by it at a desired place.

A further object is to provide a shackle which by being automatic in its action will dispense with a certain amount of labor.

In packing houses it is customary to provide a track to lead from the place of killing to a scalding vat, for instance, where a carcass is to be cleaned, and to provide a shackle by which to suspend and transfer said carcass; a man usually releasing the animal at the vat by a manipulation of the shackle but it is my purpose as in some other devices of this class to dispense with this labor by providing a shackle which as it arrives at the vat will automatically drop the carcass and afterward pass on to an apparatus that will automatically return it to the place from which it started.

In the appended drawing:—Figure 1 is an elevation of a system of inclined tracks indicating several of my improved shackles suspended therefrom and means to lift them from their lowest point of travel and cause their return to the starting place. Fig. 2 is a partial sectional elevation of my improved shackle showing one of the parts in an extended position. Fig. 3 is a similar view showing the parts in a different position. Fig. 4 is an enlarged detail of a part of the said shackle. Fig. 5 is an enlarged detail of a chain showing the manner of securing one of its ends to the shackle. Fig. 6 is a transverse section of a track showing a shackle suspended therefrom and means to lift and elevate it to a higher track-section shown in Fig. 1, and Fig. 7 is a plan of a portion of a track and a portion of the elevating device.

A indicates an inclined track suspended in any good manner for instance from a supporting head-beam B, its upper end lying in the vicinity of the place of killing while beneath its lower end is the place of deposit of the carcass, for instance, a scalding-tank or vat indicated at C. Suspended also from the beam B beneath the track A is a short secondary or auxiliary track which consists preferably of two portions D D as clearly illustrated in Fig. 6; this said section overhanging the scalding vat referred to. A track E is hung high above the track A from any suitable support F and is inclined in an opposite direction from that of the track A so that its lower end lies substantially at the highest portion of the track A. Adjacent to both tracks A and E is an elevating device consisting, for instance, of a sprocket chain G carried on sprockets H and so arranged with respect to said tracks as to be in position to engage and carry a shackle from the lower to the upper track. Power is supplied to one of the wheels whereby the chain can be kept in constant motion. At intervals from the latter suspended arms K are pivotally carried each having at its lower end an eye L, Fig. 6, by which the shackles will be lifted but this will be described more fully hereinafter.

My improved shackle is indicated clearly in Figs. 2, 3, 4 5 and 6. It consists of a hook-portion M to be suspended from the track A and to slide along it. This said portion is provided at one side with a depending extension N to form a hook to be engaged by the eye L of the arm K just mentioned. The member M is extended into the portion O to the lower end of which is secured in any good manner, as for instance by means of a cap P, a swiveled eye Q, Fig. 4, to which is attached a chain R provided with a hook S carrying at its hooked extremity an eye T from which is suspended a short chain U. Freely slidable upon the portion O and adapted to slide down over the chain R is a sleeve V bearing a flange or head W at its upper end and having at its lower end one or more hooks 2 there being two of them shown in the figures.

It is commonly the custom to attach a shackle to the leg of the carcass so that it can be transported to the place of treatment and a man is stationed at that place whose duty it is to receive and release said carcass. As differing from this method my shackle is of such a structure that when the movable part thereof (the sleeve V) is changed in position the carcass is automatically dropped without any attention whatever. As shown in Fig. 4 the hook S is passed around the leg of the carcass and hung upon the chain R, to which it is attached, (see Fig. 5) and one of the links of the short chain U is hung upon one of the hooks 2. The carcass is thus suspended from the chain R, the chain U merely assisting in opening the loop of said chain R at the time the carcass is released. The sleeve V is allowed to slip down over the said chain R as shown in Fig. 4 being in position therefore, so that the said chain U can be easily attached to it as described. The chain R having been made into a slip knot or noose about the leg thus suspended there is no chance for the carcass to slip out. The shackle is now placed upon the track A and moves down the same to the scalding vat by gravity. As it reaches the auxiliary track D before mentioned, which lies in the path of its sleeve V, said sleeve passes between the two portions thereof. The track A at this place is given a downward bend or dip as at X so as to approach nearer said track D. The sleeve being at substantially its lowest position hangs so that the under surface of its head W engages the upper surface of said track D. The sleeve being now supported in this way the dip in the track A permits the hooked portion M to drop through the sleeve and this action permits the chain to slacken and fall out of the hook S; the carcass being instantly released. The chain R is necessarily loosened since its end having attachment with the portion O is lowered with respect to the hook S which retains practically the same position with regard to its distance from the track A. The shackle continues its movement along the track A and arrives at a stop *b* where it is held until elevated automatically by the chain G before described.

It is noted that the track A extends slightly beyond the end of the supporting beam B so that the shackle may be lifted from the track and elevated without interfering with said beam. As the chain travels constantly the hangers having the eyes L one by one engage the hook N of the lowermost shackle of the series that may be used and each is carried upward and deposited upon the upper track E its hooked portion M being placed upon said track as the eye L begins its downward travel after passing over the upper wheel H. As this track is inclined as described, the shackle upon being placed thereon and released, as the eye L moves downward away from its hook M, slides down to its starting point for repeating the carcass hanging operation. The track may be so arranged that it will be continuous in that it may connect at its lower end with the track A as shown in Fig. 1. It will be seen that the hook portion M as placed upon the track E by means of the chain bears the same relation to said track as it did to the track A from which it was removed. But when it passes around the curve of the said track E at the wheel H it is reversed in position but after reaching the lower end of said track E and passing around upon the track A it bears the proper relation to the eye L of the chain G so that its hook N can be engaged. However, since it is customary to remove the shackle from the rail in hanging the carcass it could in any case be properly replaced upon the track.

The apparatus as constructed is perfectly automatic in its action after having been placed upon the track with the carcass suspended therefrom since having reached the scalding vat, or other place of deposit it will release said carcass without any attention afterward being returned automatically to its starting position.

I may make such changes in my device as will suggest themselves but without departing from the spirit and intent of the invention and its claims and it is evident that the shackle can be adapted to and used in any other line of work besides that for which it is described herein.

Having thus described my invention, I claim:—

1. The combination with an inclined track, of a shackle-portion suspended therefrom and movable therealong by gravity, a second shackle-portion carried by the first, means carried by the portions to support a load, and an inclined track adjacent to the first one and slanting in the same general direction and lying in the path of the second shackle-portion, said tracks gradually converging at their lower extremities.

2. The combination with an inclined track, of a shackle-portion suspended therefrom, a second shackle-portion carried by and slidable upon the first, means attached to one of the portions and adapted for engagement with the other portion, a second inclined track adjacent to the first and inclined in the same general direction and lying in the path of the second shackle-portion, said track portions gradually approaching one another at their lowermost extremities.

3. The combination with an inclined support, of a shackle mounted to travel thereon comprising two portions, a member suspended from the shackle and adapted to carry a load and to discharge the same when one of the portions of the shackle is moved relatively to the other, and a member suspended from the said inclined support in the path of travel of one of the portions of the shackle, said portion adapted to engage said member in its downward travel.

4. The combination with an upper inclined track, of a main shackle portion suspended therefrom and permanently carried thereby, an auxiliary portion carried by the main portion, the parts comprising two portions movable relatively, means carried by the portions to carry a load, a second inclined track adjacent to the first in the path of the shackle to engage the said auxiliary portion in its travel, the said tracks approaching one another at their lower ends whereby the main portion of the shackle is made to move downward and relative to its other portion for the purposes described.

5. The combination with an inclined track, of a rod freely suspended therefrom and slidable thereon, a sleeve freely slidable upon the rod, means to suspend said sleeve from the rod, a freely movable member attached to the rod, and means on the sleeve on which said member is detachably held.

6. The combination of a suspended shackle-portion, a sleeve vertically slidable thereon, a chain having one end attached to the said shackle-portion within the sleeve and having its free end removably held on said sleeve.

7. The combination with a track, of a rod suspended therefrom and shiftable thereon, a sleeve adapted for free vertical movement on said rod, means to limit the movement of the sleeve on the rod, a freely movable member secured to the rod, and a member on the sleeve on which the member is removably held.

8. The combination with a track, of a rod suspended therefrom and shiftable thereon, a member carried on the rod to move vertically thereon, means to limit its movement, a chain carried by the rod, and means on the sleeve on which the chain is removably held.

9. The combination with a track, of a rod freely suspended therefrom and shiftable thereon, a member carried by and movable vertically on the rod, a chain secured to said rod and removably held on the member, means adjacent to and fixed relative to the track to engage the member, said means and the track approaching one another whereby the rod and member are made to shift relatively.

10. The combination with two convergent track portions, one below the other, of a shackle comprising a member suspended from the upper track-portion, a member movable vertically upon and suspended from the first said member and adapted to engage and move upon the lower track portion, and means attached to both members adapted for carrying a load, said member when moved upon the convergent ends of the track adapted to release said load.

11. The combination with a track, and a stop at its end, of a shackle held by said stop and provided at each of two opposite sides with a hook, a sprocket chain arranged to travel upward adjacent to the stop, means carried by the chain to engage one of the hooks of the shackle, and an upper track upon which the shackle is deposited and with which the other hook of the shackle is adapted to engage.

12. In combination, a lower inclined track and an upper track, a shackle to move upon said lower track for suspending and carrying a load to a place of deposit, a member in the path of the shackle and adapted to engage it in its travel whereby to release the load automatically, and an apparatus to automatically engage and raise the shackle from said lower track to said upper track.

13. A shackle consisting of a rod bearing a part at its upper end by which to suspend it from a track, a device slidable upon the said rod and having a projecting top portion to engage a track, means to prevent the separation of the rod and the said device, a chain attached at one end to the rod within the device, a hook attached to the free end of the chain, a chain secured to said hook and a projecting portion on the device to receive the last named chain.

14. The combination with an inclined track, of a shackle portion suspended therefrom and moved therealong by gravity, a sleeve carried by and slidable vertically upon the said portion and having a projecting annular flange and an extension, a second inclined track composed of two parallel members also inclined in the same general direction as the first and lying in the path of and arranged to receive the said flange and arranged for receiving the sleeve between them, the said tracks gradually approaching one another, and means associated with the said shackle portion and adapted to engage the extension of the sleeve.

15. The combination of a track portion, a device having an ascending and a descending portion and always traveling in the same direction, its ascending portion arranged to travel in close proximity to said track, an upper track portion above the first and in close proximity to the descending portion of said device, a shackle, a hook on said shackle by which it is suspended from either of said track portions, an extension on said shackle and a member carried by the device adapted to engage said extension.

16. The combination of an inclined track portion, a device having an ascending and descending portion and always traveling in the same direction, its ascending portion arranged to travel in close proximity to said track, an upper inclined track portion also inclined and having a recurved extension also inclined, the same lying in close proximity to the descending portion of said device, a shackle, a hook by which it is suspended from either of the tracks, an extension on said shackle, and a member on said device to engage said extension.

In testimony whereof I affix my signature, in presence of two witnesses.

ARCHIBALD THOMSON.

Witnesses:
A. KEITHLEY,
L. M. THURLOW.